Jan. 3, 1956     D. F. JORGENSEN     2,729,347
COMBINATION LIFT AND DOLLY
Filed Oct. 20, 1952     3 Sheets-Sheet 1
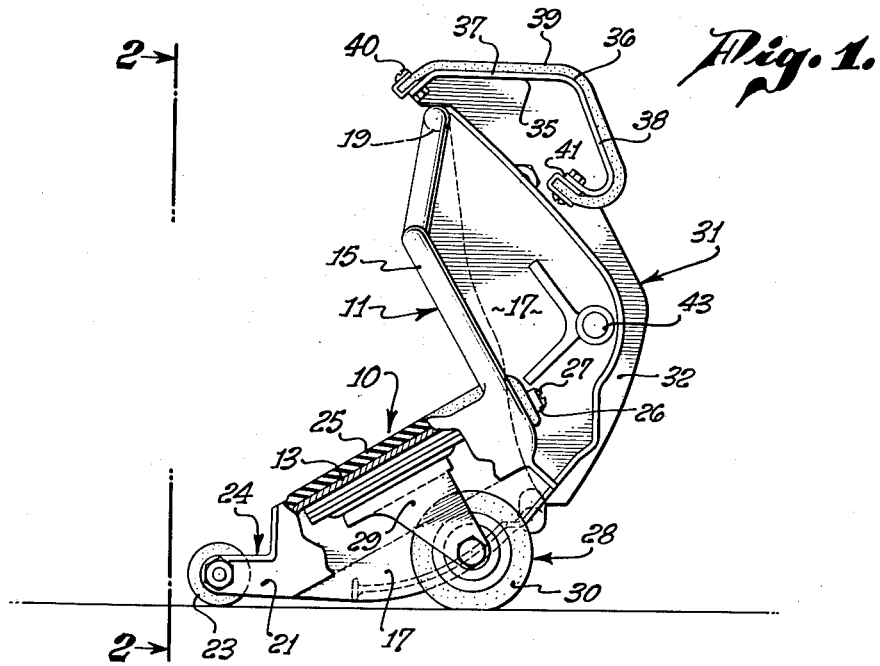
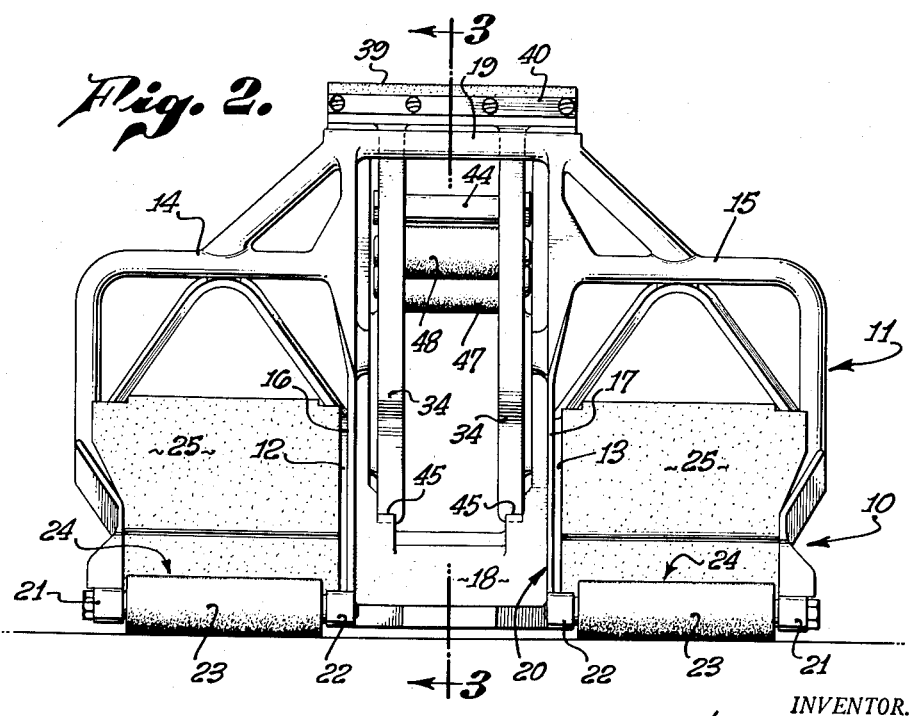
INVENTOR.
DAVID F. JORGENSEN,
BY
ATTORNEY.

Jan. 3, 1956 — D. F. JORGENSEN — 2,729,347
COMBINATION LIFT AND DOLLY
Filed Oct. 20, 1952 — 3 Sheets-Sheet 2
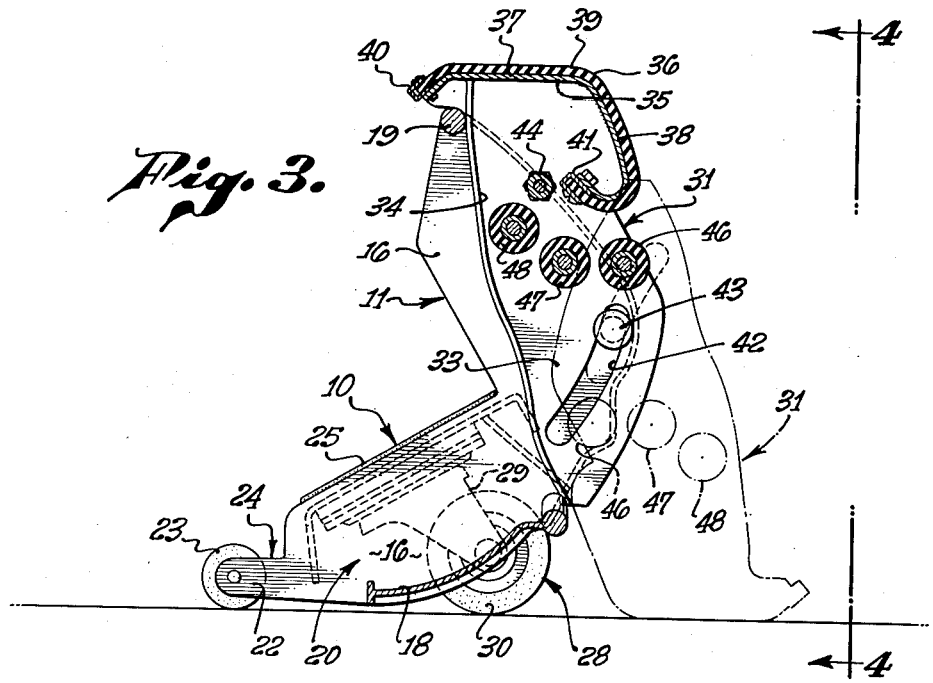
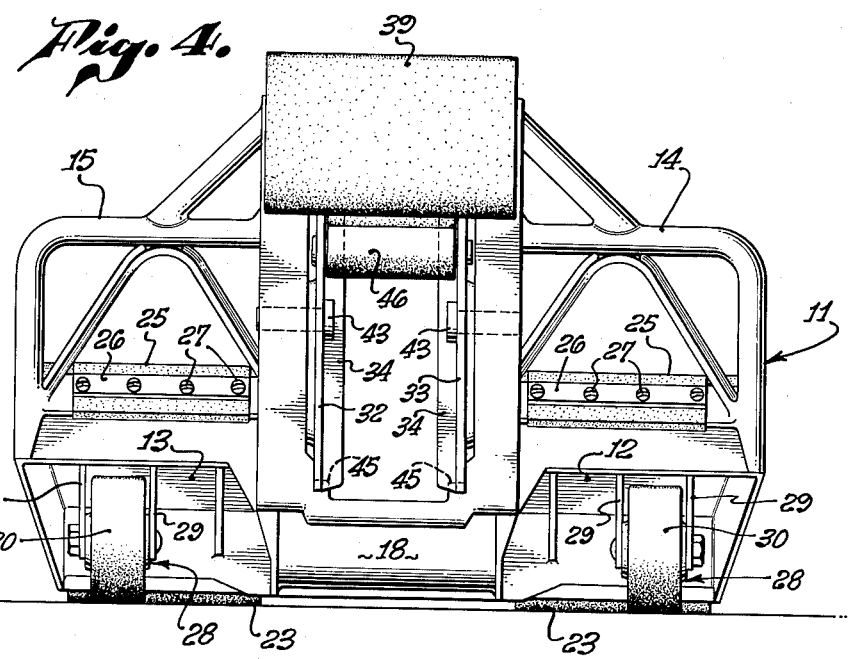
INVENTOR.
DAVID F. JORGENSEN,
BY
ATTORNEY.

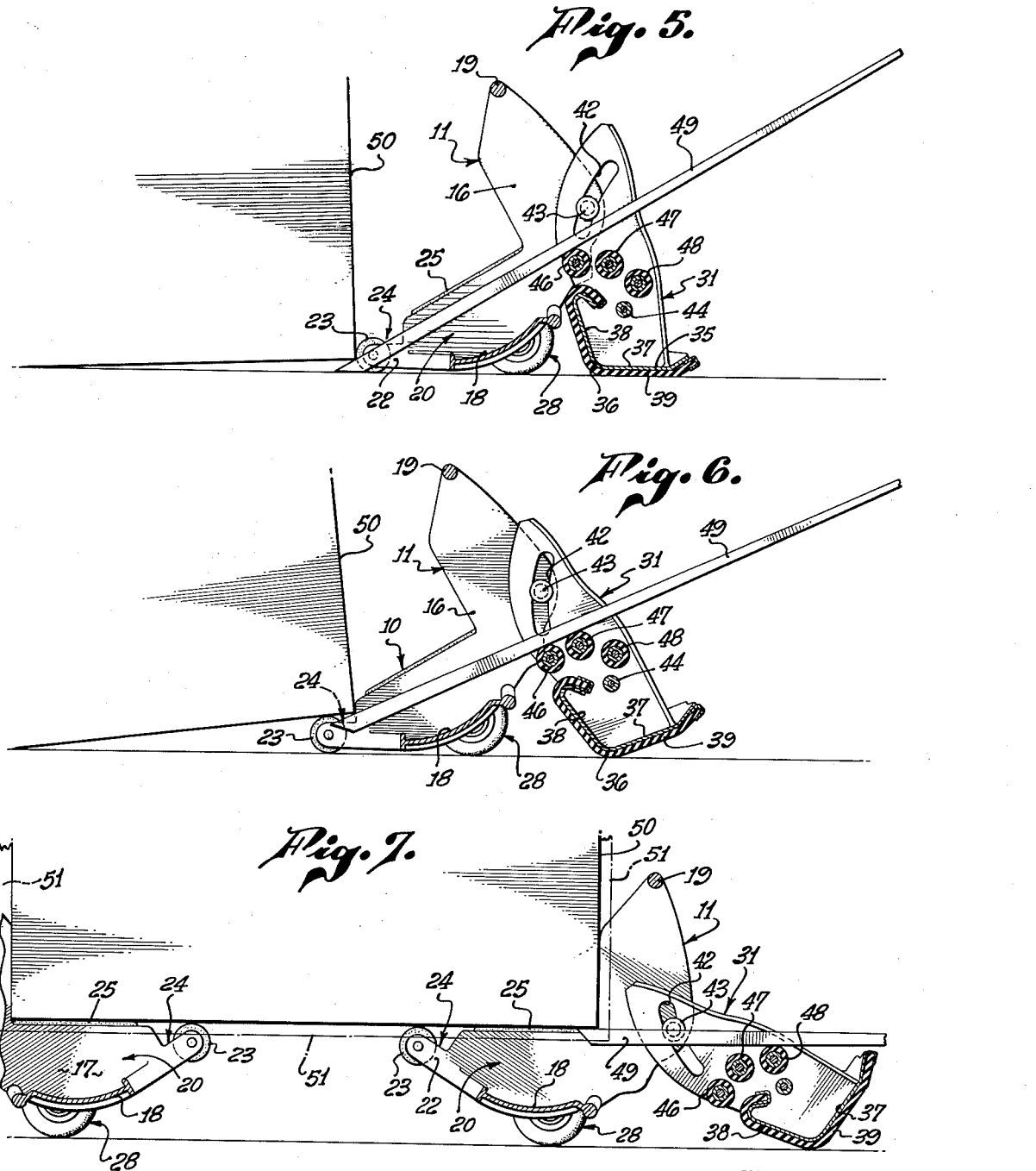

United States Patent Office 2,729,347
Patented Jan. 3, 1956

2,729,347
COMBINATION LIFT AND DOLLY
David F. Jorgensen, Altadena, Calif.
Application October 20, 1952, Serial No. 315,799
13 Claims. (Cl. 214—77)

The present invention relates generally to wheeled vehicles, and is more particularly concerned with an improved combination lift and dolly for movably supporting articles and objects, such, for example, as crates, boxes, and the like.

It is one object of the invention to provide a novel wheeled vehicle in the form of a dolly which is simple of construction, which is manually portable, and which provides an inexpensive and unique arrangement for utilizing a conventional lift bar for raising an article or object to be placed thereon, and for motivating the dolly into position under an adjacent side of the lifted article or object.

A further object is to provide in a dolly novel means for holding and elevating an object in a step-by-step manner onto a platform of the dolly.

Another object is to provide a dolly of such construction that a number of them may be placed under the object or article to be supported, which will permit movement of the article to any desired location; and which incorporates novel means for quickly and easily releasably anchoring the dollies and supported object against wheeled movement.

Having the foregoing in mind, the present invention briefly comprises a frame structure having an object supporting platform thereon, the frame being supported on main casters which are so arranged that the platform may be tilted to bring a projecting step adjacent the object which is to be raised onto the platform. As thus placed, a swingably mounted arm is rotated into a position which will retain the frame structure against movement away from the object, this arm having a fulcrum edge over which a lift bar may be utilized to raise the object initially onto the projecting step, and thereafter onto the platform. To carry out this operation, the forces which are exerted on the fulcrum act through a cam connection between the swingable arm and the framework to motivate the dolly so as to bring the platform under the raised object. When thus inserted under the object, the platform assumes a horizontal position, and the swingable arm may be moved to a position of non-use where it is releasably latched until again needed.

Further objects of the invention will be brought out in the following part of the specification, wherein detailed description is for the purpose of fully disclosing the invention without placing limitations thereon.

Referring to the accompanying drawings, which are for illustrative purposes only:

Fig. 1 is an end elevational view of a combination lift and dolly embodying the features of the present invention.

Fig. 2 is a front elevational view of the same when looking in the direction indicated from line 2—2 of Fig. 1.

Fig. 3 is a transverse section through the same, taken substantially on line 3—3 of Fig. 2.

Fig. 4 is a rear elevational view of the dolly as it appears looking in the direction indicated by line 4—4 of Fig. 3.

Figs. 5, 6 and 7 are views schematically representing the successive operative steps of utilizing the dolly, according to the present invention.

Referring generally to the drawings, for illustrative purposes, the device of the present invention embodies a generally L-shaped main frame structure, the angularly arranged parts of which are generally indicated by the numerals 10 and 11 respectively.

The main frame structure may be variously constructed and fabricated to secure the general arrangement of parts which will be described in detail. The disclosed structure is merely illustrative and in this instance the frame part 10 includes rigidly interconnected spaced apart wall members 12 and 13 which are reenforced by suitable ridges, flanges or other means and present upper planar surfaces which cooperate to form a sectionalized platform.

The frame part 11, as clearly shown in Fig. 2, is of skeleton construction and is composed of sections 14 and 15 having rigid connection with the respective wall members 12 and 13. The sections 14 and 15 cooperate to form an upstanding abutment along the rear edge of the platform. Along their confronting margins, the wall member 12 and section 14 are connected with a common wall 16, and the wall member 13 and section 15 is connected with a common wall 17.

The walls 16 and 17 are rigidly interconnected in the frame part 10 of the main frame by means of a web 18, and the sections 14 and 15 are interconnected by a rearwardly offset bridging member 19 which interconnects the upper ends of the walls 16 and 17. The walls 16 and 17 with their interconnecting web 18 and bridging member 19 cooperate to form in effect an L-shaped channel 20 which extends transversely of the main frame and divides it generally into two main sections.

As shown in Figs. 1 and 2, the wall members 12 and 13 are each provided with spaced arms 21 and 22 which are disposed below the plane of its associated wall member and project at an angle thereto. These arms in each case rotatably support an elongate roller 23, the two rollers cooperating to form along the forward edge of the platform a projecting step structure as generally indicated by the numeral 24. These rollers may be constructed of any suitable material. In the construction shown, the rollers have a covering of a material such as rubber. Likewise, the wall members 12 and 13 are, in this case, covered with a layer of material such as rubber, as indicated by the numeral 25, which is anchored along its forward and rear edges as by a retaining strip 26 held by a plurality of securing screws 27.

The main frame and associated parts are supported for wheeled movement upon swivel caster assemblies 28, one of these assemblies being mounted on the under side of each of the walls 12 and 13. It will be noted that each of these assemblies includes a swivelly mounted fork 29 which rotatably supports a roller or wheel 30 for rotation about an axis which is offset relative to the swivel axis of the fork. Thus, with the casters arranged in this manner, it will be observed in Fig. 1 that when the wheel 30 is rearwardly offset with respect to the swivel axis of the fork 29, the weight of the main frame is forwardly overbalanced with respect to the axis of rotation of the wheel 30 and therefore causes a forward tipping to dispose the frame platform in an inclined position and bring the rollers 23 into engagement with the surface upon which the device is supported.

The main frame of the device has swingably mounted thereon an arm member as generally indicated by the numeral 31. This arm member, as best illustrated in Figs. 1 and 3, is constructed with a pair of spaced parallel side rails 32 and 33 (Fig. 4) each of which has a corresponding edge flange 34 and is integrally connected with an end plate 35 which is deformed between its ends at 36 to provide substantially flat or planar portions 37 and 38 in angular relation. The plate 35 is likewise covered with a sheet 39 of suitable material, such as rubber, this sheet being anchored to the end plate margins along its edges 40 and 41.

At the opposite ends of the side rails 32 and 33, as best shown in Fig. 3, each side rail is provided with a curved cam slot 42 within which there is slidably mounted a pin 43 which is anchored in the associated wall 16 or 17 as the case may be. The side rails 32 and 33 are further held in fixed spaced relationship by providing adjacent the ends which are connected to the end plate 35, a spacing sleeve 44 which is suitably connected to the respective side rails at its ends.

The arm member 31, mounted as described above, is therefore susceptible of relative swinging movement with respect to the main frame to a position of use as shown in dotted lines in Fig. 3 and position of non-use as shown in full lines. In non-use position, the arm member may be releasably latched with the upper ends of the edge flanges 34 respectively bearing against the bridging member 19 by lifting the arm member until the lower ends of the edge flanges 34—34 may be disposed behind shoulders 45—45 formed at the rear end of the web 18, as shown in Fig. 2.

When desired, the arm member 31 may be released with respect to its non-use position and swung to the dotted line position shown in Fig. 3 which constitutes a position of use, and in which position the portion of the sheet 39 covering the planar portion 37 is brought into engagement with the surface upon which the device is supported. In this position, the device is anchored against wheeled movement in a direction towards the arm member.

Referring again to Figs. 2 and 3, it will be observed that a plurality of rollers, in this instance three rollers 46, 47 and 48 are rotatably supported between the side rails 32 and 33 of the arm member with their axes of rotation in parallel relation and spaced apart on an arcuate locus line. The rollers 46, 47 and 48, as shown in Figs. 3 and 5, in the used position of the arm member 31 are positioned rearwardly of the caster assemblies 28—28, and with the roller 46 positioned forwardly of the line of deformation 36. These rollers form successively engageable fulcrum edges over which a lifting bar 49 of conventional construction may be fulcrumed, when the bar is inserted within the channel 20 with its lifting end extending forwardly of the rollers 23—23 for engagement with an object such as a box or crate 50, as shown in Fig. 5. If pressure is now manually applied at the other end of the lifting bar 49, the crate 50 will be lifted until the bar comes in contact with the roller 47, at which position the rollers 46 and 47 cooperate to form a dwell point, as shown in Fig. 6. At this dwell point, it will be observed that the crate has been lifted a sufficient height to permit its disposition over the step structure 24. At this time, the lifting pressure which is applied against the rollers 46 and 47 acts to swing the arm member 31 in a counter-clockwise direction, as viewed in Fig. 5. This causes a camming action through the cam slot 42 and associated pin 43, such as to push the step structure 24 under the edge of the lifted crate 50, as shown in Fig. 6. Movement of the crate 50 on to the step structure 24 constitutes the initial operation in the placing of the dolly device of the present invention under the object which is to be placed on the platform of the main frame.

In carrying out the next operation, the arm member 31 is now again reset to the position shown in Fig. 5, and a new purchase taken under the edge of the crate by the bar 49. Downward pressure is again applied to the outer end of the bar 49 and this pressure is continued over the successive fulcrum rollers 46 and 47 until a position is reached as shown in Fig. 7, with the bar 49 in engagement with the roller 48. In this position, pressure is applied against the roller 48 which causes the crate 50 to be raised, and the main frame motivated by the swinging action of the arm member 31 due to the downwardly acting fulcrum forces into a position with the platform below the crate and the associated side of the crate against the upstanding abutment formed by the frame sections 14 and 15.

The bar 49 may now be removed and the arm member 31 restored to the position shown in Fig. 5 with the planar portion 37 downwardly disposed, in which position it will act to prevent movement of the frame and associated crate towards it, and will thus act as an anchor while a similar dolly device is placed under the opposite side of the crate or object by similar operations to those described above. If desired, the arm members of the respective dollies may now be moved to non-use positions and latched, as shown in Figs. 1 and 3. Once the crate or object is disposed on the platforms of the main frames, the crate may be moved in any desired direction, the weight of the crate or object maintaining the platforms horizontal and preventing tilting of the main frames. The caster assemblies may now be swivelled in any direction to accomplish the desired movement of the crate or other object supported on the dollies.

The channel 20 in addition to being adapted to receive the lifting bar 49 also accommodates the dolly for utilization with those types of crates which utilize a longitudinally extending reenforcing strip 51 as shown in dotted lines (Fig. 7) along its longitudinal bottom and side center lines. This strip, when the crate is mounted on the dolly devices will extend into the channel 20 and thus permit the angularly related sides of the crate to properly seat on the platform and against the upstanding abutment surfaces.

Various modifications may suggest themselves to those skilled in the art without departing from the spirit of my invention, and, hence, I do not wish to be restricted to the specific form shown or uses mentioned, except to the extent indicated in the appended claims.

I claim:

1. A dolly, comprising: a frame structure supported on a wheel member for movements over a supporting surface; a platform carried by said structure adapted to support an object placed thereon and having a dividing channel between its ends; an arm member; a cam connection between said arm member and said structure enabling selective movements of said arm member to positions of use and non-use, said arm member in its position of use having a surface portion engageable with said supporting surface; and means carried by said arm member defining a plurality of spaced rollers over which a lift bar extending through said channel may be successively fulcrumed to lift an object and apply pressure through said cam connection to move said structure in a direction to move the platform under the lifted object.

2. A dolly, comprising: a frame structure supported on a wheel member for movements over a supporting surface; a platform carried by said structure adapted to support an object placed thereon and having a dividing channel between its ends; an arm member; a cam connection between said arm member and said structure enabling selective movements of said arm member to positions of use and non-use, said arm member in its position of use having a surface portion engageable with said supporting surface; and means carried by said arm member defining a plurality of spaced rollers over which a lift bar extending through said channel may be successively fulcrumed to lift an object and apply pressure through said cam connection to move said structure in a direction to place the platform under the lifted object.

3. A dolly, comprising: a frame structure supported on a wheel member for movements over a supporting surface; a platform carried by said structure adapted to support an object placed thereon and having a dividing channel between its ends; an arm member; a cam connection between said arm member and said structure enabling selective movements of said arm member to positions of use and non-use, said arm member in its position of use having a surface portion engageable with said supporting surface; and means carried by said arm member defining a plurality of spaced edges over which a lift bar extending through said channel may be fulcrumed to lift an object and apply pressure through said cam connection to move said structure in a direction to place the platform under the lifted object.

4. A dolly, comprising: a frame structure supported on a wheel member for movements over a supporting surface; a flatform carried by said structure adapted to support an object placed thereon and having a dividing channel between its ends; an arm member; a cam connection between said arm member and said structure enabling selective movements of said arm member to positions of use and non-use, said arm member in its position of use having a surface portion engageable with said supporting surface; means carried by said arm member defining a plurality of spaced edges over which a lift bar may be fulcrumed to lift an object and apply pressure through said cam connection to move said structure in a direction to place the platform under the lifted object.

5. A dolly, comprising: a frame structure; a platform carried by said structure adapted to support an object placed thereon and having a dividing channel between its ends; wheel members respectively positioned on opposite sides of said channel supporting said structure for movements over a supporting surface; an arm member defining a fulcrum swingably connected to said structure at one end of said channel for selective movements to positions of use and non-use, said arm member in its position of use having friction engagement with said supporting surface; and a cam slot and pin connection between said structure and said arm member, effective in the use position of said arm member to cause wheeled movement of the structure in response to the application of downwardly acting pressure on said fulcrum.

6. A dolly, comprising: a frame structure, a platform carried by said structure adapted to support an object placed thereon and having a dividing channel between its ends; wheel members respectively positioned on opposite sides of said channel supporting said structure for movements over a supporting surface; an arm member defining a fulcrum swingably connected to said structure at one end of said channel for selective movements to positions of use and non-use, said arm member in its position of use having friction engagement with said supporting surface; and cam acting means between said structure and said arm member, effective in the use position of said arm member to cause wheeled movement of the structure in response to the application of downwardly acting pressure on said fulcrum.

7. A dolly, comprising: a frame structure supported on a wheel member for movements over a supporting surface; a platform for receiving an object thereon; an arm member carried by said structure and supported for swinging movement; and a curved end surface on said arm for making rocking engagement with said supporting surface.

8. A dolly construction, comprising: a frame structure supported on a wheel member for movements over a supporting surface; a platform carried by said frame structure having a forward edge and a rear edge; a roller rotatably supported adjacent the forward edge of said platform defining a projecting step and cooperating with said wheel member to support the platform in inclined position; an arm member carried by said frame adjacent said rear edge having a fulcrum edge; and means connecting said arm member to said frame structure for movement into and out of engagement with said supporting surface, said fulcrum edge being exposed for use in the supporting surface engaging position of said arm member.

9. A dolly construction, comprising: a frame structure supported on a wheel member for movements over a supporting surface; a platform carried by said frame structure having a forward edge and a rear edge; a roller rotatably supported adjacent the forward edge of said platform defining a projecting step and cooperating with said wheel member to support the platform in an inclined position; an arm member carried by said frame adjacent said rear edge having a fulcrum edge; and means connecting said arm member to said frame structure for movement to positions of use and non-use of said fulcrum edge, said arm in the use position of said fulcrum having friction engagement with said supporting surface.

10. In a device of the character described: a frame structure providing a platform area having a forward edge and a rear edge, an upstanding abutment adjacent said rear edge and projecting arms adjacent said forward edge positioned below the plane of said platform area; means forming a transversely extending dividing channel between the ends of said platform area and upstanding abutment; rollers supported on said arms on opposite sides of said channel with their axes of rotation extending longitudinally in the same direction as said platform; a pair of swivel casters below the platform area supporting said frame structure for wheeled movement over a supporting surface; an arm member carried by said frame structure adjacent said rear edge; and means connecting said arm member to said frame structure for movement into and out of engagement with said supporting surface.

11. A device of the character described, comprising: a platform structure tiltably supported on a wheel member for movements over a supporting surface; a fulcrum member carried by said structure having a surface area adapted to make a rolling friction engagement with said supporting surface and oppose rearward movement of the platform structure, when the tilted platform is placed against an object to be lifted from said supporting surface on to the platform; a lift bar adapted to have one end inserted under said object and fulcrumed over said fulcrum member, said fulcrum member being actuated under lifting forces to roll in a direction to move the platform to a position under the object; and means for releasably latching said fulcrum member in a position of non-use.

12. In a device of the character described: a frame structure providing a platform area having a forward edge and rear edge, an upstanding abutment adjacent said rear edge and projecting arms adjacent said forward edge positioned below the plane of said platform area; a roller supported on said arms with its axis of rotation extending longitudinally in the same direction as said platform; a pair of swivel casters below the platform area supporting said frame structure for wheeled movement over a supporting surface; an arm member carried by said frame structure adjacent said rear edge; and means connecting said arm member to said frame structure for movement into and out of engagement with said supporting surface.

13. A device of the character described, comprising: a platform structure tiltably supported on a wheel member for movements over a supporting surface; a fulcrum member carried by said structure having a surface area adapted to make a rolling friction engagement with said supporting surface and oppose rearward movement of the platform structure, when the tilted platform is placed against an object to be lifted from said supporting surface onto the platform; and a lift bar adapted to have one end inserted under said object and fulcrumed over said fulcrum member, said fulcrum member being actuated under lifting forces to roll in a direction to move the platform to a position under the object.

References Cited in the file of this patent

UNITED STATES PATENTS

| | | |
|---|---|---|
| 509,054 | Thomas | Nov. 21, 1893 |
| 1,537,396 | White | May 12, 1925 |
| 1,709,737 | Perry | Apr. 16, 1929 |
| 2,008,887 | Venables | July 23, 1935 |
| 2,549,489 | Krause | Apr. 17, 1951 |
| 2,607,502 | Willits | Aug. 19, 1952 |

FOREIGN PATENTS

| | | |
|---|---|---|
| 372,913 | Germany | Apr. 6, 1923 |